(12) United States Patent
Higuchi

(10) Patent No.: US 7,944,571 B2
(45) Date of Patent: May 17, 2011

(54) IMAGE FORMING DEVICE WITH CARBON COPY FUNCTION

(75) Inventor: Tetsuya Higuchi, Iwakura (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1161 days.

(21) Appl. No.: 10/921,139

(22) Filed: Aug. 19, 2004

(65) Prior Publication Data

US 2005/0052675 A1    Mar. 10, 2005

(30) Foreign Application Priority Data

Aug. 21, 2003   (JP) ................................ 2003-297694

(51) Int. Cl.
    *G06F 15/00* (2006.01)
(52) U.S. Cl. ....... 358/1.13; 358/1.9; 358/1.15; 358/1.16
(58) Field of Classification Search .................. 358/1.13, 358/1.15, 1.16, 1.9
    See application file for complete search history.

(56) References Cited

U.S. PATENT DOCUMENTS

| | | | | |
|---|---|---|---|---|
| 4,129,073 A * | 12/1978 | Ritzerfeld | ......................... | 101/2 |
| 5,061,958 A * | 10/1991 | Bunker et al. | .................. | 399/81 |
| 5,815,643 A * | 9/1998 | Van Deurzen et al. | ...... | 358/1.13 |
| 6,384,923 B1 * | 5/2002 | Lahey | .......................... | 358/1.13 |
| 6,446,051 B1 * | 9/2002 | Gupta | ............................. | 705/52 |
| 7,046,388 B1 * | 5/2006 | Shibata | ........................ | 358/1.18 |
| 7,145,685 B2 * | 12/2006 | Simpson | ..................... | 358/1.18 |
| 2001/0056449 A1 * | 12/2001 | Kawamoto et al. | .......... | 707/527 |
| 2002/0018233 A1 | 2/2002 | Mori | | |
| 2002/0122165 A1 * | 9/2002 | Robinson et al. | ............... | 355/77 |
| 2003/0140810 A1 * | 7/2003 | Sugimoto | ..................... | 101/484 |
| 2003/0164977 A1 * | 9/2003 | Aagesen | ...................... | 358/1.15 |
| 2003/0202010 A1 * | 10/2003 | Kerby et al. | .................. | 345/744 |
| 2004/0012802 A1 * | 1/2004 | Allen et al. | ................... | 358/1.13 |
| 2004/0012812 A1 * | 1/2004 | Shimizu | ...................... | 358/1.15 |
| 2004/0042032 A1 * | 3/2004 | Laughlin | ..................... | 358/1.15 |
| 2004/0057073 A1 * | 3/2004 | Egawa et al. | ................. | 358/1.15 |
| 2004/0145779 A1 * | 7/2004 | Kuribayashi | ................. | 358/1.16 |

FOREIGN PATENT DOCUMENTS

| | | |
|---|---|---|
| JP | A-8-90846 | 4/1996 |
| JP | A 10-20588 | 1/1998 |
| JP | A-10-240483 | 9/1998 |
| JP | A 11-212401 | 8/1999 |
| JP | A 2001-328325 | 11/2001 |
| JP | A 2002-57826 | 2/2002 |
| JP | A 2002-311753 | 10/2002 |
| JP | A 2003-29942 | 1/2003 |

* cited by examiner

*Primary Examiner* — David K Moore
*Assistant Examiner* — Mark R Milia
(74) *Attorney, Agent, or Firm* — Oliff & Berridge, PLC

(57) ABSTRACT

Tray information for $b^{th}$ copy is read from a RAM. Next, print data is read from the RAM, and format data corresponding to a macro ID for the $b^{th}$ copy is read from the RAM. Then, image data is generated by combining the print data and the format data. Finally, based on the image data, an image is formed on a recording medium that was supplied from a tray designated by the tray information for the $b^{th}$ copy.

12 Claims, 10 Drawing Sheets

```
JOB
   • JOB NAME
   • USER NAME
     ......
   • I/F INFORMATION
   • UEL INFORMATION

PAGE
      • PAGE NUMBER
      • PAPER SIZE

IMAGE DATA
```

| Carbon Copy | Carbon Copy Menu | = On/Off/Auto/Local |
|---|---|---|
| | Copies | = 1 ~ ?? |
| | Copy1 Tray | = Auto/Tray1/Tray2/Tray3 |
| | Copy1 Macro | = REGISTERED MACRO ID |
| | Copy2 Tray | = Auto/Tray1/Tray2/Tray3 |
| | Copy2 Macro | = REGISTERED MACRO ID |
| | . . . | |
| | . . . | |

THE SAME NUMBER OF TRAY AND MACRO AS COPIES ARE DISPLAYED

MACRO SETTING PROCESS
WHEN MACROS WITH MACRO IDS OF 1, 2, 3 ARE REGISTERED

WHEN NO MACROS ARE REGISTERED

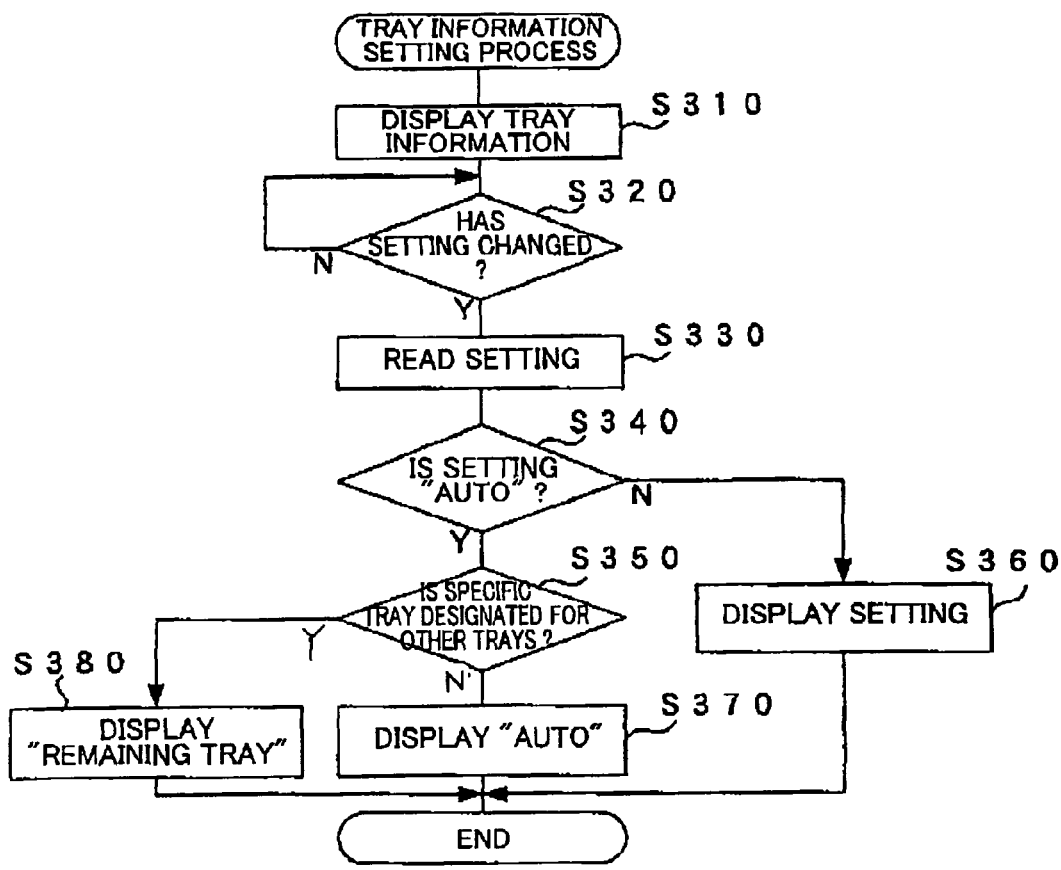

IMAGE FORMING DEVICE WITH CARBON COPY FUNCTION

BACKGROUND OF THE INVENTION

1. Field of the Invention

The present invention relates to an image forming device for forming an image on a recording medium based on print data.

2. Related Art

There have been provided impact dot printers that feed a sheet of carbon paper (paper with ink applied to the rear surface thereof) and a sheet of transfer-receiving paper superimposed on the carbon paper into a print portion and print the same information on the carbon paper and the transfer-receiving paper (as an image taken from the rear of the carbon paper) simultaneously by performing a printing operation on the carbon paper. The carbon paper is used as the customer's copy, and the transfer-receiving paper is used as a file copy. For that reason, the format for the carbon paper is generally made to be different from the format for the transfer-receiving paper, so that a user can see at a glance which is the customer's copy and which is the file copy. However, in order to obtain a customer's copy and a file copy with laser printers that are now common nowadays, the user must issue two instructions for printing in the format for the customer's copy and for printing in the format for the file copy. This necessitates manual work. For that reason, Japanese Patent Application-Publication No. 2001-328325 proposes a laser printer that stores format data for a customer's copy format and for a file copy format, and a copy is printed based on image data combined with corresponding format data.

However, in the technique disclosed in Japanese Patent Application-Publication No. 2001-328325, a recording medium is fed from the same paper supply tray regardless of whether a customer's copy is printed or a file copy is printed. Therefore, if a user wishes to use different types of recording medium for a customer's copy and a file copy in this technique, the user has to place first a sheet of paper for the customer's copy and then a sheet of paper for the file copy in sequence in the same paper supply tray, which requires a tiresome manual work.

The same problem arises not only in a laser printer, but also in any image forming devices, such as ink-jet printers, that form an image on a recording medium on the basis of print data.

SUMMARY OF THE INVENTION

In the view of foregoing, it is an object of the present invention to overcome the above problems, and also to provide an image forming device that prints a customer's copy and a file copy without troubling a user to perform extra manual operation even when a different recording medium is used for the customer's copy and the file copy.

In order to attain the above and other objects, according to one aspect of the present invention, there is provided an image forming device including a plurality of paper supply trays, a memory, a controller, an image forming unit, and a paper supply mechanism. The memory stores print data, format data, and print condition information. The print condition information includes copy information indicating a number of copies to print the print data, format information designating format data for each copy, and tray information designating one of the plurality of paper supply trays for each copy. The number of copies is an integer greater than one. The controller generates image data by combining format data and print data stored in the memory. The image forming unit forms an image on a recording medium based on the image data generated by the controller. The paper supply mechanism supplies a recording medium to the image forming unit from selected one of the paper supply trays. The controller selectively performs an image forming control operation for each copy. In the image forming control operation, the controller selects one of the paper supply trays for a copy based on the tray information stored in the memory, controls the paper supply mechanism to supply a recording medium to the image forming unit from the selected one of the paper supply trays, reads print data from the memory, reads format data for the copy based on the format information from the memory, generates image data by combining the print data and the format data read from the memory, and controls the image forming unit to form an image on the recording medium supplied by the paper supply mechanism based on the image data.

According to different aspect of the present invention, there is provided an image forming device including a plurality of paper supply trays, a memory, a controller, an image forming unit, and a paper supply mechanism. The memory stores print data and print condition information. The print condition information includes copy information indicating a number of copies to print the print data and tray information designating one of the plurality of paper supply trays for each copy. The number of copies is an integer greater than one. The controller designates one of the paper supply trays. When a specific one of the paper supply trays has been designated for a specific copy, the controller designates one of the paper supply trays other than the specific one of the paper supply trays for at least one of copies other than the specific copy. The image forming unit forms an image on a recording medium based on print data. The paper supply mechanism supplies a recording medium to the image forming unit from selected one of the paper supply trays. The controller selectively performs an image forming control operation for each copy. In the image forming control operation, the controller selects one of the paper supply trays for a copy based on the tray information stored in the memory, controls the paper supply mechanism to supply a recording medium to the image forming unit from the selected one of the paper supply trays, reads print data from the memory, and controlling the image forming unit to form an image on the recording medium supplied by the paper supply mechanism based on the print data.

According to different aspect of the present invention, there is provided an image forming device including a plurality of paper supply trays, a memory, an image forming unit, a paper supply mechanism, and a controller. The memory stores print data and print condition information. The print condition information includes copy information indicating a number of copies to print the print data and tray information designating one of the plurality of paper supply trays for each copy. The number of copies is an integer greater than one. The image forming unit forms an image on a recording medium based on print data. The paper supply mechanism supplies a recording medium to the image forming unit from selected one of the paper supply trays. The controller selectively performs an image forming control operation for each copy. In the image forming control operation, the controller selects one of the paper supply trays for each copy based on the tray information stored in the memory, controls the paper supply mechanism to supply a recording medium to the image forming unit from the selected one of the paper supply trays, reads print data from the memory, and controls the image forming unit to form an image on the recording medium supplied by the paper supply mechanism based on the print data read from the memory. The controller performs a determination as to whether or not to perform the image forming control operation based on at least one of port information indicating an input port through which the print data was received, terminal information indicating a terminal from which the print data was received, and command-format information indicating a command format of the print data.

According to different aspect of the present invention, there is provided an image forming device including a plurality of paper supply trays for supporting a recording medium, print data storing means for storing print data, format data storing means for storing format data, print condition information storing means for storing print condition information, image data generating means for generating image data by combining format data stored in the format data storing means and print data stored in the print data storing means, image forming means for forming an image on a recording medium based on the image data generated by the image data generating means, paper supply means for supplying a recording medium to the image forming means from selected one of the paper supply trays, and image forming control means for selectively performing an image forming control operation for each copy. The print condition information includes copy information indicating a number of copies to print the print data, format information designating format data for each copy, and tray information designating one of the plurality of paper supply trays for each copy. The number of copies is an integer greater than one. In the image forming control operation, the image forming control means selects one of the paper supply trays for a copy based on the tray information stored in the print condition information storing means, controls the paper supply means to supply a recording medium to the image forming means from the selected one of the paper supply trays, reads print data from the print data storing means, reads format data for the copy from the format data storing means based on the format information, controls the image data generating means to generate image data by combining the print data read from the print data storing means and the format data read from the format data storing means, and controls the image forming means to form an image on the recording medium supplied by the paper supply means based on the image data.

According to different aspect of the present invention, there is provided an image forming device including a plurality of paper supply trays, print data storing means for storing print data, print condition information storing means for storing print condition information, designating means for designating one of the paper supply trays, image forming means for forming an image on a recording medium based on print data, paper supply means for supplying a recording medium to the image forming means from selected one of the paper supply trays, and image forming control means for selectively performing an image forming control operation for each copy. The print condition information includes copy information indicating a number of copies to print the print data and tray information designating one of the plurality of paper supply trays for each copy. The number of copies is an integer greater than one. When a specific one of the paper supply trays has been designated for a specific copy, the designating means designates one of the paper supply trays other than the specific one of the paper supply trays for at least one of copies other than the specific copy. In the image forming control operation, the image forming control means selects one of the paper supply trays for a copy based on the tray information stored in the print condition information storing means, controls the paper supply means to supply a recording medium to the image forming means from the selected one of the paper supply trays, reads print data from the print data storing means, and controlling the image forming means to form an image on the recording medium supplied by the paper supply means based on the print data.

According to different aspect of the present invention, there is provided an image forming device including a plurality of paper supply trays, print data storing means for storing print data, print condition information storing means for storing print condition information, image forming means for forming an image on a recording medium based on print data, paper supply means for supplying a recording medium to the image forming means from selected one of the paper supply trays, and image forming control means for selectively performing an image forming control operation for each copy. The print condition information includes copy information indicating a number of copies to print the print data and tray information designating one of the plurality of paper supply trays for each copy. The number of copies is an integer greater than one. In the image forming control operation, the image forming control means selects one of the paper supply trays for a copy based on the tray information stored in the print condition information storing means, controls the paper supply means to supply a recording medium to the image forming means from the selected one of the paper supply trays, reads print data from the print data storing means, and controls the image forming means to form an image on the recording medium supplied by the paper supply means based on the print data read from the print data storing means. The image forming control means performs a determination as to whether or not to perform the image forming control operation based on at least one of port information indicating an input port through which the print data was received, terminal information indicating a terminal from which the print data was received, and command-format information indicating a command format of the print data.

BRIEF DESCRIPTION OF THE DRAWINGS

In the drawings:

FIG. 8 is a flowchart representing a tray information setting process according to the embodiment of the present invention;

FIG. 9 is an explanatory view of the tray information setting process;

PREFERRED EMBODIMENT OF THE PRESENT INVENTION

Next, a laser printer according to an embodiment of the present invention will be described with reference to the accompanying drawings.

Figure 1:
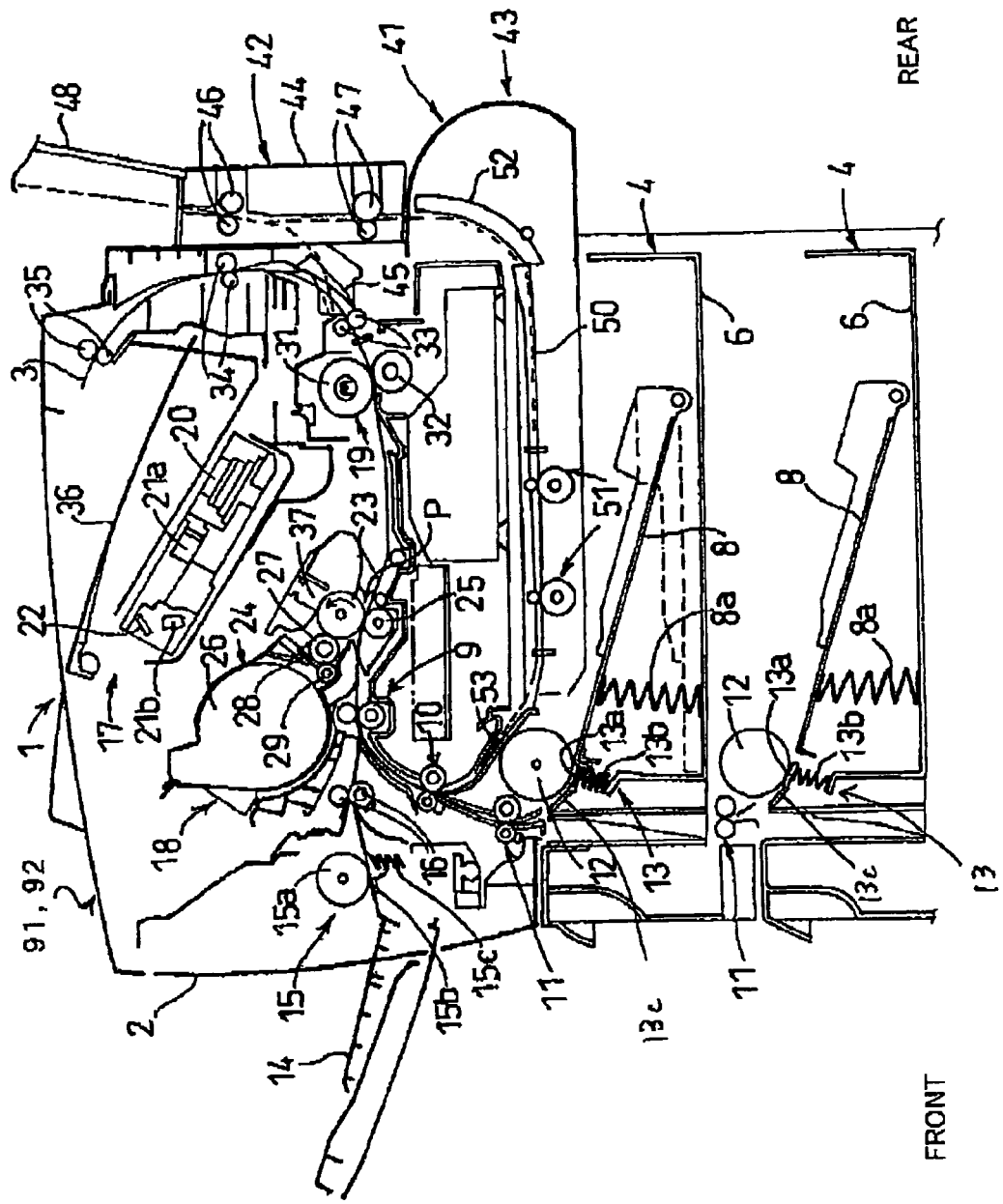
FIG. 1 is a plan view of a laser printer according to an embodiment of the present invention.

As shown in FIG. 1, a laser printer 1 according to the present embodiment includes a main casing 2 that houses a plurality of feeder sections 4, a process unit 18, and a fixing device 19. The feeder sections 4 are for supplying recording paper 3, and the process unit 18 is for forming images on the supplied paper 3. A display unit 91 and an operating unit 92 are provided on the top surface of the main casing 2. The display unit 91 is formed of LCD or LED and displays operation status of the laser printer 1. The operating unit 92 is for inputting various settings of the laser printer 1.

In this embodiment, the left of the main casing 2 in FIG. 1 is referred to as "front side", and the side of the main casing 2 that is opposite to the front side is referred to as "rear side".

Each feeder section 4 includes a feed tray 6 detachably mounted in the bottom section of the main casing 2, a sheet pressing plate 8 disposed inside the feed tray 6, a paper supply roller 12 disposed above one end of the sheet pressing plate 8, and a separation pad 13.

Although the laser printer 1 of the present embodiment includes two feeder sections 4, the laser printer 1 could include three or more feeder sections 4.

The sheet pressing plate 8 is capable of supporting a stack of sheets 3. The sheet pressing plate 8 is pivotably supported at its end furthest from the supply roller 12 so that the end of the sheet pressing plate 8 that is nearest the supply roller 12 can move upward and downward. A spring 8a is provided to the rear surface of the sheet pressing plate 8 and urges the sheet pressing plate 8 upward. The sheet supply roller 12 and the separation pad 13 are disposed in confrontation with each other.

A pad 13a formed of a material having a large coefficient of friction is pressed towards the paper supply roller 12 by a spring 13b that is disposed on the bottom side of a pad supporter 13c of the separation pad 13.

Note that the widths of the pad 13a and the paper supply roller 12 are shorter that the width of the paper 3 in a widthwise direction perpendicular to a paper feed direction in which the paper 3 is transported. When the paper 3 is being fed, the pad 13a and the paper supply roller 12 only contacts the central portion of the paper 3 in the widthwise direction.

Figure 2:
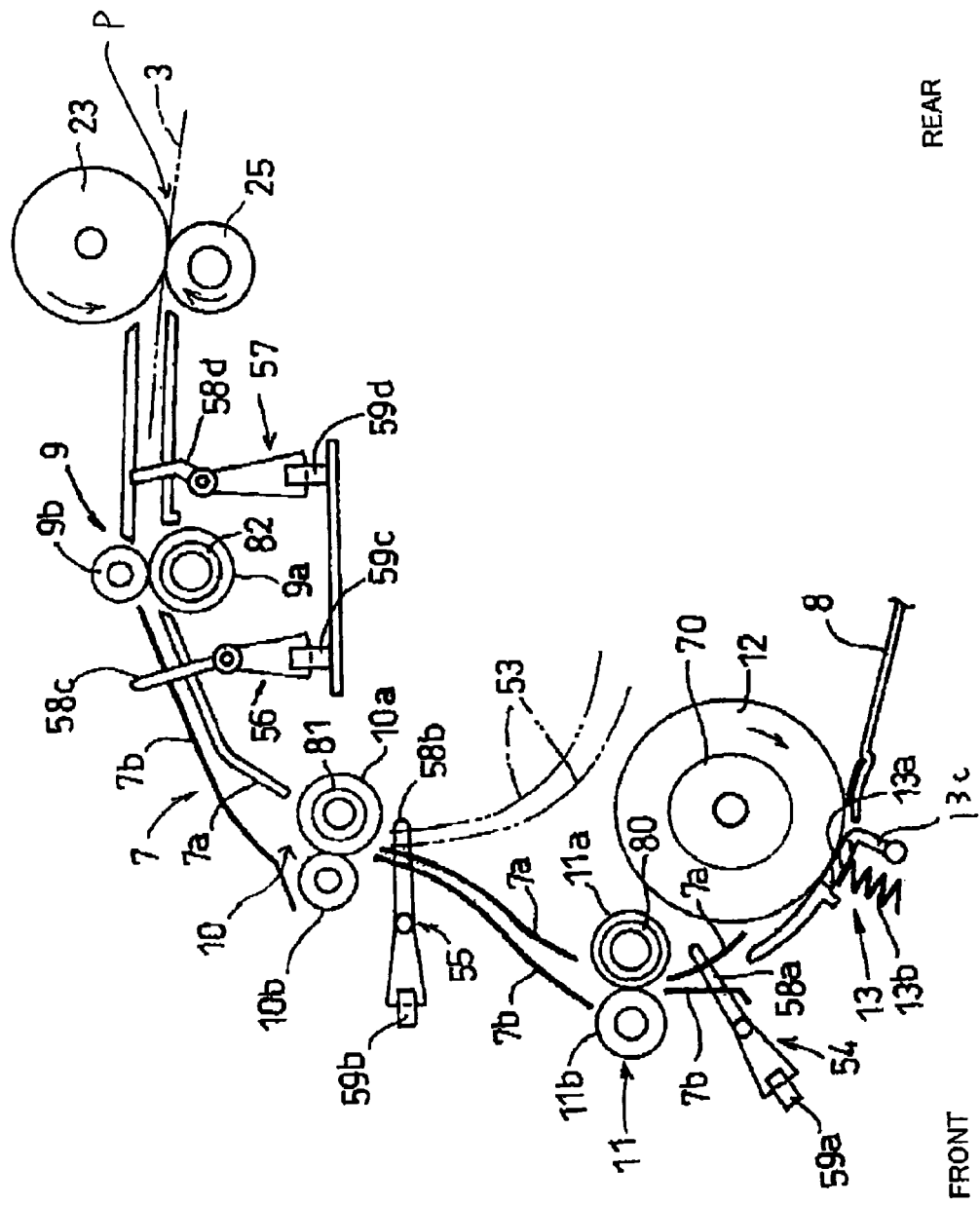
FIG. 2 is an enlarged view of components of the laser printer of FIG. 1.

As shown in FIG. 2, a feed path 7 is arranged in a curved form from the paper supply roller 12 to an image formation position P (a portion at which a photosensitive drum 23 contacts a transfer roller 25, in other words, the position at which a toner image on the photosensitive drum 23 is transferred to the paper 3). The feed path 7 is formed in a curve by a pair of guide plates 7a and 7b for guiding the broad surface of the paper 3. Along the feed path 7 are disposed at a suitable spacing the paper supply roller 12, a pair of feed rollers 11, a pair of feed rollers 10, and a pair of registration rollers 9 in this order from the upstream to the downstream in the paper feed direction. The pair of feed rollers 11 includes a drive roller 11a and a driven roller 11b, and the pair of feed rollers 10 includes a drive roller 10a and a driven roller 10b. The pair of registration rollers 9 include a drive roller 9a and a driven roller 9b disposed immediately upstream of the image formation position P in the paper feed direction. A third paper sensor 54 is disposed immediately upstream from the feed rollers 11 in the paper feed direction. A second paper sensor 55 is disposed immediately upstream from the feed rollers 10 in the paper feed direction, and a first paper sensor 56 is disposed immediately upstream from the registration rollers 9 in the paper feed direction. An image timing sensor 57 is disposed immediately downstream from the registration rollers 9 in the paper feed direction. These sensors 54 to 57 include sensor levers 58a, 58b, 58c, 58d and sensors 59a, 59b, 59c, 59d. Each sensor lever 58a-58d pivots when one end is pushed by the leading edge of the paper 3 being fed. Each sensor 59a-59d detects the position of the other end of the corresponding sensor lever 58a-58d so as to detect that the leading edge of the paper 3 has reached a predetermined position. Examples of the sensors 59a-59d include a potointerrupter.

In the feeder section 4, urging force of the spring 8a under the sheet pressing plate 8 presses the uppermost sheet 3 on the sheet pressing plate 8 toward the supply roller 12 so that rotation of the supply roller 12 moves the uppermost sheet 3 to a position between the supply roller 12 and the separation pad 13. In this way, one sheet 3 at a time is separated from the stack and supplied to the feed rollers 11. Then, the sheet 3 is conveyed to the feed rollers 10 and then to the registration rollers 9. The registration rollers 9 perform a desired registration operation on the supplied sheet 3 and transport the same to the image formation position P.

The laser printer 1 further includes a multipurpose tray 14, a multipurpose sheet supply roller 15a, and a multipurpose sheet supply pad 15b, all of which are disposed above the feeder section 4 at the front side of the main casing 2. A spring 15c is provided beneath the multipurpose sheet supply pad 15b and presses the multipurpose sheet supply pad 15b up toward the multipurpose sheet supply roller 15a.

The multipurpose tray 14 is for manual paper feed. The multipurpose paper supply roller 15a is for supplying the paper 3 that is stacked in the multi-purpose tray 14.

The multipurpose tray 14 includes a pair of feed rollers 16, which are a drive roller and a driven roller. A multipurpose-tray paper sensor (not shown) having the same configuration as that of the sensors 54-57 is disposed immediately upstream of the feed rollers 16 in the paper feed direction.

With this configuration, rotation of the multipurpose sheet supply roller 15a moves sheets 3 one at a time from the stack on the multipurpose tray 14 to a position between the multipurpose sheet supply pad 15b and the multipurpose sheet supply roller 15a so that the sheets 3 on the multipurpose tray 14 can be supplied one at a time to the registration rollers 9 via the feed rollers 16.

A scanner unit 17 is provided in the upper section of the main casing 2 but beneath a discharge tray 36. The scanner unit 17 is provided with a laser emitting section (not shown), a rotatingly driven polygon mirror 20, lenses 21a, 21b, and a reflection mirror 22. The laser emitting section emits a laser beam based on desired image data. The laser beam passes through or is reflected by the polygon mirror 20, the lens 21a, the reflection mirror 22, and the lens 21b in this order so as to irradiate, in a high speed scanning operation, the surface of the photosensitive drum 23 of the process unit 18.

The process unit 18 includes a drum cartridge and a developing cartridge 24 detachably mounted to the drum cartridge. The drum cartridge houses the photosensitive drum 23, a scorotron charger 37, and the transfer roller 25. The developing cartridge 24 includes a toner hopper 26, a developing roller 27, a thickness regulating blade 28, and a toner supply roller 29.

The toner hopper 26 is filled with positively charging, non-magnetic, single-component toner as a developer. The toner is supplied to the developing roller 27 by the toner supply roller 29. At this time, the toner is positively tribocharged between the toner supply roller 29 and the developing roller 27. Further, toner supplied onto the developing roller 27 is carried between the thickness regulating blade 28 and the developing roller 27 with the rotation of the developing roller 27, forming a thin layer of toner having a uniform thickness on the developing roller 27.

The photosensitive drum 23 is rotatably supported in confrontation with the developing roller 27. The photosensitive drum 23 is formed of a main drum that is grounded. The surface of the main drum is a positively charging photosensitive layer formed of organic photosensitive material, such as polycarbonate or the like.

The scorotoron charger 37 is disposed above the photosensitive drum 23 and is spaced away from the photosensitive drum 23 by a predetermined space so as to avoid direct contact with the photosensitive drum 23. The scorotron charger 37 is a positive-charge scorotron type charge unit for generating a corona discharge from a tungsten charge wire, for example, to uniformly charge the surface of the photosensitive drum 23 to a positive charge.

As the photosensitive drum 23 rotates, the scorotron charger 37 forms a uniform positive charge over the surface of the rotating photosensitive drum 23. Subsequently, electrostatic latent images are formed on the surface of the photosensitive drum 23 by a high-speed scanning of a laser beam emitted from the scanning unit 17.

Then, the positively charged toner carried on the surface of the developing roller 27 is brought into contact with the photosensitive drum 23 as the developing roller 27 rotates. At this time, the toner is selectively attracted to portions of the photosensitive drum 23 that were exposed to the laser beam and, therefore, have a lower potential than the rest of the surface having a uniform positive charge. In this way, a toner image is formed on the photosensitive drum 23.

The transfer roller 25 is supported in the drum cartridge at a position below and in confrontation with the photosensitive drum 23 so as to be rotatable in a clockwise direction in FIG. 1. The transfer roller 25 includes a metal roller shaft and a roller portion covering the roller shaft. The roller portion is made from rubber material that has ionic conductivity. At the time of toner image transfer, the transfer roller 25 is applied with a predetermined transfer bias (transfer forward bias) from a transfer bias power source. Therefore, the toner image carried on the surface of the photosensitive drum 23 is transferred onto the sheet 3 as the sheet 3 passes between the photosensitive drum 23 and the transfer roller 25.

In this laser printer 1, any residual toner that remains on the surface of the photosensitive drum 23 after the toner image has been transferred by the transfer roller 25 onto the paper 3 is recovered by the developer roller 27 in a cleanerless method. By removing residual toner from the surface of the photosensitive drum 23 by the cleanerless method, a cleaner, such as a blade, and collection means for storing collected toner can be dispensed with. Therefore, the laser printer 1 can be simpler, smaller, and less expensive.

The fixing device 19; is disposed to the side of and downstream from the process unit 18 in the sheet feed direction. The fixing device 19 includes a heat roller 31, a pressure roller 32, and a pair of feed rollers 33. The pressure roller 32 presses the heat roller 31. The feed rollers 33 are disposed downstream from the heat roller 31 and the pressure roller 31. The heat roller 31 is made of metal, such as aluminum, and includes a heater, such as a halogen lamp, for generating heat. The heat roller 31 thermally fixes toner image transferred onto the sheet 3 thereto as the sheet 3 passes between the heat roller 31 and the pressure roller 32. Then, the sheet 3 is conveyed by the feed rollers 33 to the feed rollers 34 and 35 within a feed path at the rear side of the main casing 2. Afterwards, the sheet 3 is discharged onto the discharge tray 36.

The laser printer 1 further includes a return feed unit 41 for enabling to perform two-sided printing, that is, to form images on both surfaces of the paper 3. The return feed unit 41 includes a reversing mechanism 42 and a return feed tray 43. The reversing mechanism 42 is attached externally to the rear side of the main casing 2, and the return feed tray 43 is removably inserted above the uppermost feeder portion 4.

The reversing mechanism 42 includes a casing 44, a flapper 45, reversing rollers 46, and return feed rollers 47. The casing 44 has a substantially rectangular shape and is attached externally to the main casing 2. The flapper 45, the reversing rollers 46, and the return feed rollers 47 are housed inside the casing 44. A reversing guide plate 48 protrudes upward from the upper end of the casing 44.

The flapper 45 is pivotably provided near and downstream of the feed rollers 33 in the rear section of the main casing 2. By toggling the excitation of a solenoid (not shown) ON and OFF, the conveying direction of the recording sheet 3 conveyed by the feed roller 33 can be switched between the direction toward the feed rollers 34 and the direction toward the reversing rollers 46.

In order to discharge paper 3 with an image printed on one side onto the discharge tray 36, the flapper 45 is pivoted upward. On the other hand, to perform two-sided printing, the flapper 45 is switched to the direction towards the reversing rollers 46. Then, the paper 3 sandwiched between the reversing rollers 46 is fed towards the reversing guide plate 48 by the forward rotation of the reversing rollers 46. Subsequently, the paper 3 is fed toward the return feed rollers 47 by the reverse rotation of the reversing rollers 46. The paper 3 is fed by inclined rollers 51 along a curved guide plate 52 and a main tray body 50 with the side edges of the paper 3 contacting reference plates (not shown). Then, the paper 3 is returned to the feed rollers 10 via a return feed guide plate 53. As a result, the paper 3 is reversed so that the unprinted surface of the paper 3 faces upward at the feed rollers 10 and the registration rollers 9. Therefore, an image can be formed on the rear surface of the paper 3 when the paper 3 passes the image formation position P.

Figure 3:
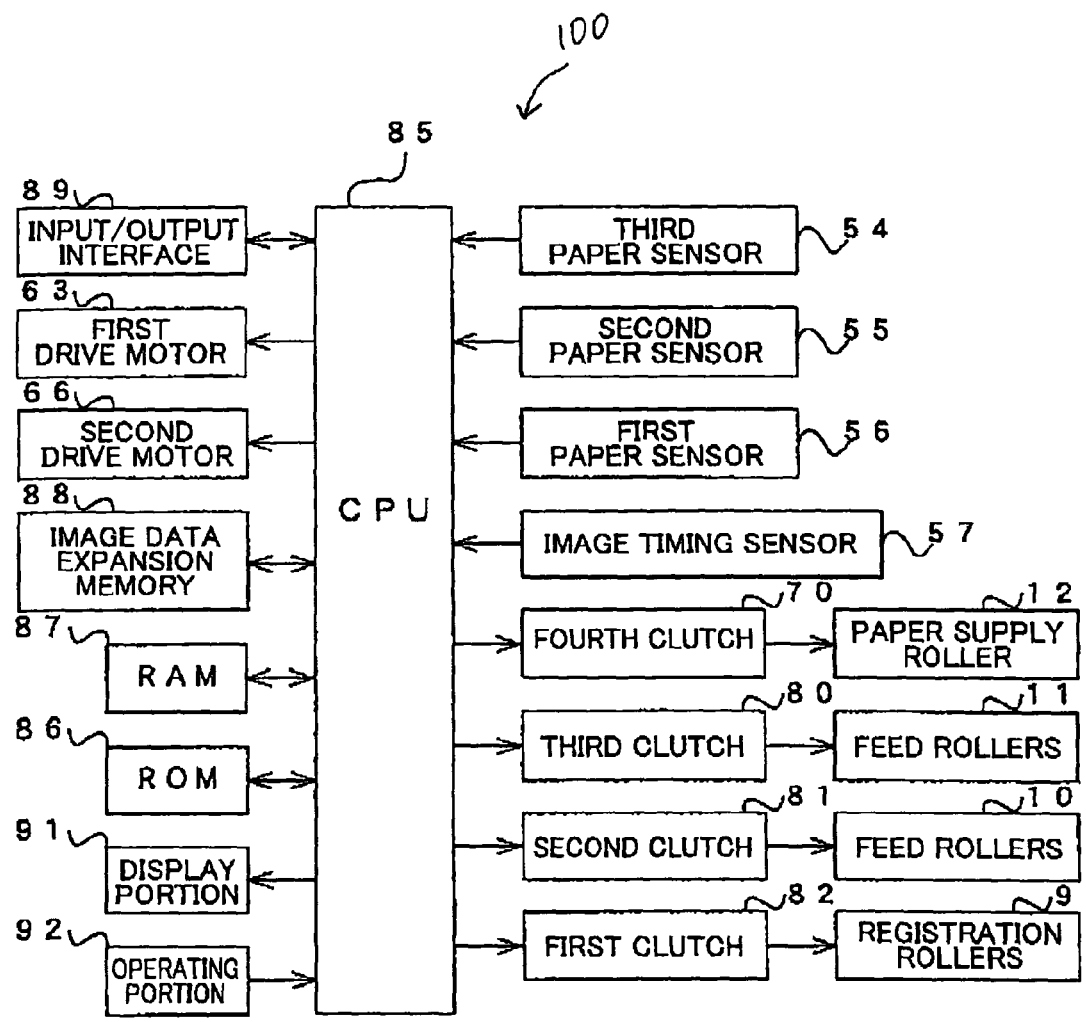
FIG. 3 is a block diagram of a control portion of the laser printer of FIG. 1.

Next, a control unit 100 of the laser printer 1 will be described with reference to FIG. 3. As shown in FIG. 3, the control unit 100 includes a central processing unit (CPU) 85 for perform various calculations for control the conveying operations and the like, a read only memory (ROM) 86 for storing control programs and the like, a random access memory (RAM) 87 for temporarily storing various data, an image-data spreading memory 88, an input/output interface 89. The CPU 85 can receive commands for image formation or print job via the input/output interface 89.

Figures 4A, 4B:
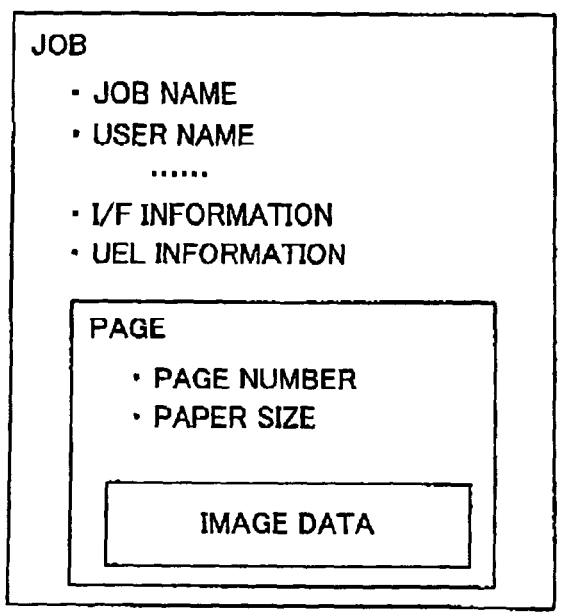
FIG. 4(a) is an explanatory view of a print job.
FIG. 4(b) is an explanatory view of print condition information stored in a RAM according to the embodiment of the present invention.

The RAM 87 is used for storing a print job. As shown in FIG. 4(a), a print job includes data indicating the job name and user name, interface (I/F) information, Universal Exit Language (UEL) information, page information and the like. I/F information indicates an input port of the laser printer 1 that has received print data. The page information includes page number data, page size data, image data, and the like.

The RAM 87 is also used for storing format data and print condition information. Format data is data indicating format of various documents, such as certificates, reports, or applications, and stamp marks to be marked to documents, such as "Customer's Copy", "File Copy", or "Company Confidential". Each format data has a macro ID.

Print condition information is information for implementing a carbon copy and includes "number-of-copies information" that indicates the number of copies to be printed based on print data, "macro ID" that designates format data for each copy, and "tray information" that designates one of the plurality of paper supply trays 6 for each copy.

It should be noted that in this embodiment "carbon copy" means duplicating print data, creating plural sets of new print data that is combination of format data and duplicated print data, and printing the newly created print data. For example, print data is duplicated, and the duplicated print data is combined with format data for "Customer's Copy" stamp mark to create new print data, and the new print data is printed.

As shown in FIG. 4(b), print condition information is stored in the RAM 87 in a two-stage hierarchy. "Carbon Copy" item is stored in the first stage. On the other hand, items "Carbon Copy Menu", "Copies", "Copy1 Tray", "Copy1 Macro", "Copy2 Tray", "Copy2 Macro", and the like are stored in the second stage.

Note that the items "Copy3 Tray", "Copy3 Macro", . . . , "Copy(N) Macro", "Copy(N) Tray" (N is a positive integer) are stored according to designated number of copies. "Carbon Copy Menu" item indicates the settings relating to the carbon copy function. The "Carbon Copy Menu" item is selected from and set to one of "ON" for enabling the carbon copy function, "OFF" for disabling the carbon copy function, "AUTO" for enabling the carbon copy function only if no UEL information is included in a print job, and "Local" for enabling the carbon copy function only when a print job is received through a local network. UEL information is attached to print job when the print job is received through a printer driver. In this embodiment, the "Carbon Copy Menu" item is initially set to "OFF".

The "Copies" item is a variable that indicates designated number of copies to print when performing carbon copy printing, and the value is a positive integer greater than zero. In this embodiment, the "Copies" item is initially set to 1.

The "Copy(N) Tray" (N is a positive integer) item designates the paper supply tray 6 to supply the paper 3 for an $N^{th}$ copy. The "Copy(N) Tray" is selected from and set to one of "AUTO" for automatically selecting one of the paper supply trays 6, "Tray 1" for selecting the first paper supply tray 6, "Tray 2" for selecting the second paper supply tray 6, and "Tray 3" for selecting the third paper supply tray 6. Note that "Tray 1", Tray 2", and the like except "AUTO" are registered in accordance with the number of paper supply trays 6 supplied to the laser printer 1.

The "Copy(N) Macro" (N is a positive integer) item designates macro ID number of format data that is to be combined with print data for an $N^{t}h$ copy.

In this manner, tray information and macro ID are correlated with the copy number of each copy and stored in the RAM 87.

As shown in FIG. 3, the third sheet sensor 54, the second sheet sensor 55, the first sheet sensor 56, and the image timing sensor 57 are all connected to the CPU 85 via an input interface (not shown), so that detection signals of these sensors 54-57 are input to the CPU 85. Also, a first drive motor 63, a second drive motor 66, a fourth clutch 70, a third clutch 80, a second clutch 81, and a first clutch 82 are all connected to the CPU 85 via an output interface (not shown). The fourth clutch 70, the third clutch 80, the second clutch 81, and the first clutch 82 are for the supply rollers 12, the feed rollers 11, the feed rollers 10, and the registration rollers 9, respectively.

The first drive motor 63 is connected to a drive shaft of the drive roller 10a of the feed rollers 10 via a gear train (not shown) so that the drive roller 10a is driven to rotate in the clockwise direction in FIG. 2 by the rotational force transmitted from the first drive motor 63.

The first drive motor 63 is also connected to a drive shaft of the drive roller 11a of the feed rollers 11 via a gear train (not shown) so that the drive roller 11a is driven to rotate in the clockwise direction in FIG. 2 by the rotational force transmitted from the first drive motor 63.

The first drive motor 63 is further connected to drive shafts of the paper feed rollers 12 via a gear train (not shown) so that the paper feed rollers 12 are driven to rotate in the clockwise direction in FIG. 2 by the rotational force transmitted from the first drive motor 63.

The second drive motor 66 is connected to a drive shaft of the photosensitive drum 23 via a gear train (not shown) so that the photosensitive drum 24 is driven to rotate in the counter clockwise direction in FIG. 2 by the rotational force transmitted from the second drive motor 66.

The second drive motor 66 is further connected to a drive shaft of the drive roller 9a of the registration rollers 9 via a gear train (not shown) so that the drive roller 9a is driven to rotate in the clockwise direction in FIG. 2 by the rotational force transmitted from the second drive motor 66.

The first clutch 82, the second clutch 81, and the third clutch 80 are electromagnetic clutches inserted to respective drive rollers 9a, 10a, 11a. The electromagnetic clutch in an engaged state transmits the drive force of the drive motor 63, 66 to the corresponding drive roller 9a, 10a, 11a, and the electromagnetic clutch in a disengaged state does not transmit the drive force to the corresponding drive roller 9a, 10a, 11a so that the drive roller 9a, 10a, 11a freely rotates.

The CPU 85 performs various processes based on instructions input through the operating unit 92, such as print condition information setting process, process for setting number of copies, macro selection process, and tray information setting process to be described later. The CPU 85 also controls the display unit 91 to display information, such as the results of the process.

Note that the rest of the configuration of the laser printer 1 of this embodiment is in accordance with known techniques, so further description thereof will be omitted.

Figure 5:
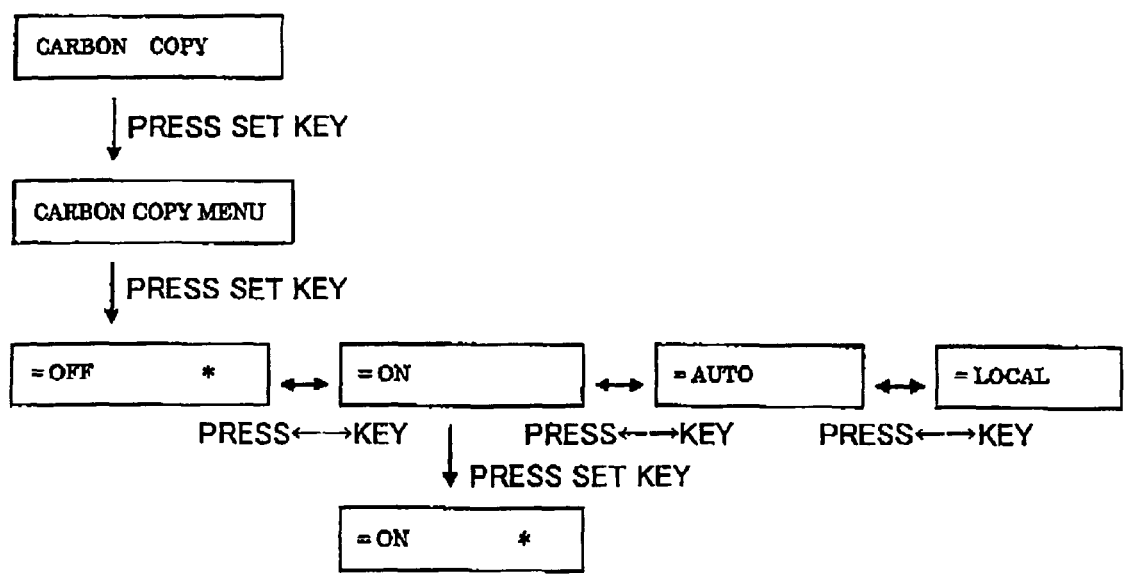
FIG. 5 is an explanatory view of a print condition information setting process according to the embodiment of the present invention.

Next, the print condition information setting process executed by the CPU 85 of the laser printer 1 will be described with reference to FIG. 5. FIG. 5 is an explanatory view of the print condition information setting process. In this example, it is assumed that the laser printer 1 includes three paper supply trays 6. However, this process can equally well be applied to a laser printer provided with two or more paper supply trays 6.

Upon receiving an instruction for setting the carbon copy function from the user through the operating unit 92, the "Carbon Copy" item is read from the RAM 87 and displayed on the display unit 91.

If a "Set" key of the operating unit 92 is pressed, then the "Carbon Copy Menu" item is read from the RAM 87 and is displayed on the display unit 91. If the "Set" key is pressed again, "OFF" to which the "Carbon Copy Menu" is initially set is read from the RAM 67 and displayed on the display unit 91. It should be noted that the asterisk "*" indicates the current setting of an item. Each time the "→" key is pressed from the state in which "OFF" is being displayed, "ON", "AUTO", and "Local" are read from the RAM 87 in this order and displayed on the display unit 91. Also, from the state in which "Local" is displayed, each time "←" key is pressed, "AUTO", "ON", and "OFF" are read in this order from the RAM 87, that is in the reversed order from when the "→" key is pressed, and displayed on the display unit 91. When the "Set" key of the operating unit 92 is pressed, the currently displayed item is selected as the "Carbon Copy Menu" item, and an asterisk "*" is displayed to the right of the selected item.

Note that if any item other than "OFF" is selected, then the "Copies" item is automatically read from the RAM 87 and displayed on the display unit 91, and then the process proceeds to the process for setting number of copies to be described next.

Figure 6A:
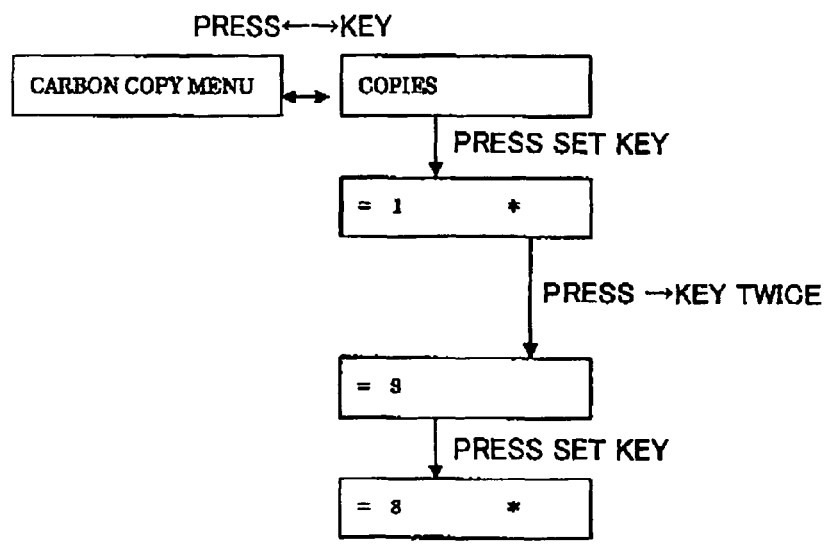
FIG. 6(a) is an explanatory view of a process for setting number of copies according to the embodiment of the present invention.
Figure 6B:
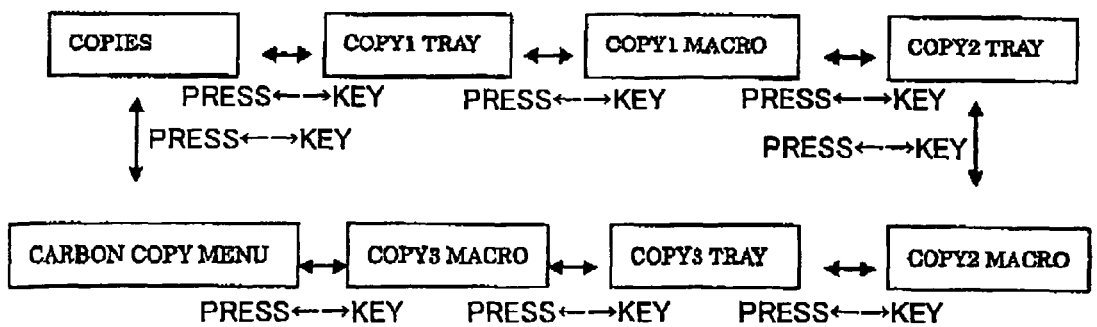
FIG. 6(b) is an explanatory view of the process for setting number of copies.

The process for setting number of copies executed by the CPU 85 of the laser printer 1 will be described with reference to FIG. 6(a) and FIG. 6(b). FIGS. 6(a) and 6(b) are explanatory views of the process for setting number of copies.

As described above, the process for setting number of copies is executed when any item other than "OFF" is selected in the print condition information setting process. At the beginning of the process for setting number of copies, the "Copies" item is being displayed on the display unit 91 as shown in FIG. 6(a). When the "Set" key of the operating unit 92 is pressed while the "Copies" item is displayed in this manner, the value to which the number of copies is initially set is read from the RAM 87 and displayed on the display unit 91. In this embodiment, the number of copies is initially set to 1.

Then, if the "←" key of the operating unit 92 is pressed, the number of copies stored in the RAM 87 is reduced by 1, and the updated number is displayed on the display unit 91. On the other hand, if the "→" key is pressed, then the number of copies stored in the RAM 87 is increased by 1, and the updated number is displayed on the display unit 91. When the "Set" key is pressed, a number of copies is set to the number currently displayed on the display unit 91, and an asterisk "*" is displayed to the right of the number.

Note that if the "←" key or "→" key is pressed while the "Copies" item is being displayed on the display unit 91 at the beginning of the process for setting number of copies, then the "Carbon Copy Menu" item is read from the RAM 87 and displayed on the display unit 91. When the "Set" key is pressed while the "Carbon Copy Menu" item is being displayed in this manner, the print condition information setting process described above is executed.

When the number of copies is determined as described above, the same number of the "Copy(N) Tray" item and the "Copy(N) Macro" item as the determined number of copies are registered in the second stage of the hierarchy shown in FIG. 4(b). Also, the "Auto" item and the same number of the "Tray(N)" items as the number of paper supply trays 6 provided to the laser printer 1 are registered for each of the "Copy(N) Tray" items (see FIG. 4(b)). Then, the "Copies" item is again read from the RAM 87 and displayed on the display unit 91 as shown in FIG. 6(b).

If the "←" or "→" key of the operating unit 92 is pressed afterwards, each item stored in the second stage is read from the RAM 87 in sequence and displayed on the display unit 91 as shown in FIG. 6(b).

More specifically, each time the "→" key is pressed form the state in which the "Copies" item is being displayed, "Copy1 Tray" item, "Copy1 Macro" item, "Copy2 Tray" item, "Copy2 Macro" item, "Copy3 Tray" item, "Copy3 Macro" item, "Carbon Copy Menu" item are read in this order from the RAM 87 and displayed on the display unit 91. On the other hand, each time the "←" key is pressed, these items are read in the reverse order from when the "→" key is pressed and displayed on the display unit 91.

When the "Set" key is pressed while the "Copy(N) Macro" item is being displayed on the display unit 91, the "Copy(N) Macro" item is read from the RAM 87 and displayed on the display unit 91. Then, a macro selection process to be described later is executed. On the other hand, if the "Set" key is pressed when the "Copy(N) Tray" item is being displayed on the display unit 91, then a tray information setting process to be described later is executed.

Figure 7A:
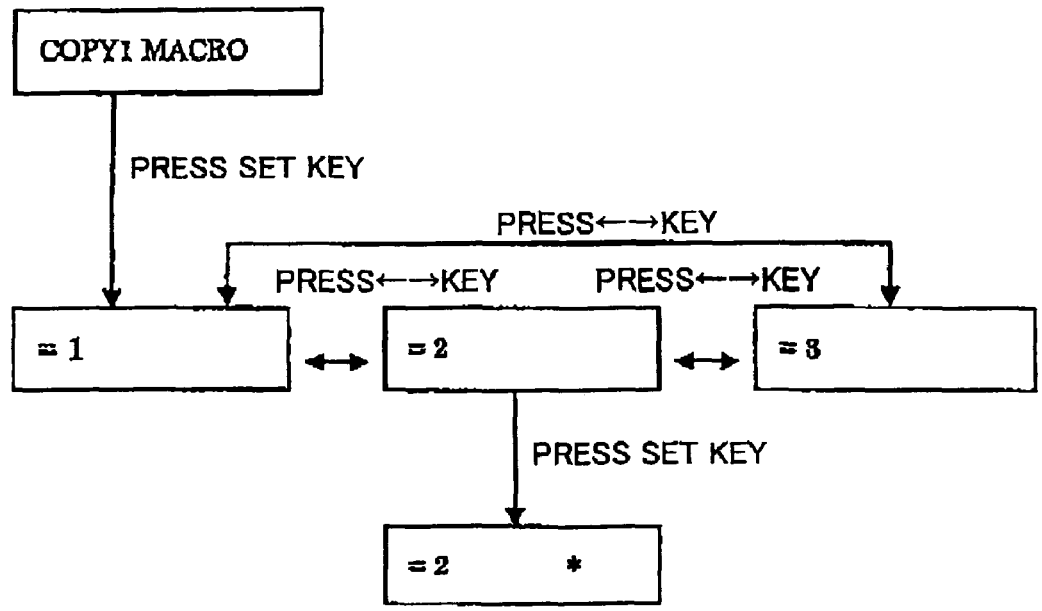
FIG. 7(a) is an explanatory view of a macro selection process according to the embodiment of the present invention.
Figure 7B:
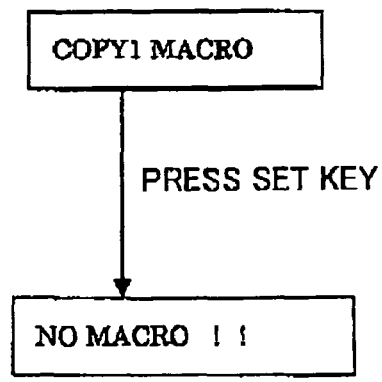
FIG. 7(b) is an explanatory view of the macro selection process.

Next, the macro selection process executed by the CPU 85 will be described with reference to FIGS. 7(a) and 7(b). FIGS. 7(a) and 7(b) are explanatory diagram of the macro selection process.

The macro selection process is started when the "Copy(N) Macro" item is selected in the process for setting number of copies. When the "Set" key is pressed while the "Copy(N) Macro" item is being displayed at the beginning of the macro selection process, an initial value of the macro ID is read from the RAM 87 and displayed on the display unit 91 as shown in FIG. 7(a). In this embodiment, the initial value of the macro ID is set to 1.

Next, each time the "←" key or "→" key is pressed, numerical values "1" to "N" are displayed in sequence on the display unit 91 if N number of macros have been registered. More specifically, suppose that the numerical value "1" is currently being displayed on the display unit 91. Then, each time the "→" key is pressed, the numerical values from "2" to "N" is displayed on the display unit 91 in ascending sequence. On the other hand, each time the "←" key is pressed, numerical values "N" to "2" are displayed on the display unit 91 in descendent sequence. Note that if no macros are registered, "NO MACRO!!" is displayed on the display unit 91 as shown in FIG. 7(b).

When the "Set" key is depressed, a macro corresponding to the currently displayed numerical value is selected, and an asterisk "*" is displayed to the right of the numerical value. Afterwards, the "Copy(N) Macro" item is read from the RAM 87 and displayed on the display unit 91, enabling the user to continue the process of FIG. 6(b).

Next, the tray information setting process executed by the CPU 85 will be described with reference to the flowchart in FIG. 8. The tray information setting process is started when the "Copy(N) Tray" item is selected in the process for setting number of copies.

First in S310, the "Copy1 Tray" to "Copy(N) Tray" items and the tray information of these items are read from the RAM 87 and all displayed on the display unit 91. In this embodiment, the initial setting for the tray information is the "AUTO".

In S320, it is determined whether or not the tray information has been changed. This determination is made in the following manner. That is, each time the "←" key or "→" key is pressed, the "Copy1 Tray" item to the "Copy(N) Tray" item are displayed in sequence on the display unit 91. When the "Set" key is pressed, a changing process for changing the setting of the currently displayed item is executed. In this changing process, each time the "←" key or "→" key is pressed, the items "Tray1" to "Tray(N)" and "AUTO" are displayed in sequence. When the "Set" key is displayed, the currently displayed item is selected, and the contents of the tray information stored in the RAM 81 are updated accordingly.

In S320, if it is determined that the tray information has not been changed by referencing the contents of the RAM 87 (NO:S320), then the process repeats S320 until the tray information is changed. It should be noted, however, that this process ends if an instruction specifying the end of this process is received from the user through the operating unit 92. If it is determined that the tray information has been changed (YES:S320), then, the process proceeds to S330.

In S330, the setting of the tray information that was determined to have been changed in S320 is read from the RAM 87.

In S340, it is determined whether or not the setting of the tray information read in S330 is "AUTO". If not (NO:S340), then in S360, the read setting is displayed. Also, in S360, if "Auto" has been set for any other trays, then the setting for the other trays is changed from "Auto" to "Remaining Tray". Afterwards, the process ends. On the other hand, if so (YES: S340), then the process proceeds to S350.

In S350, it is determined whether or not a specific tray is designated for other Trays. If not (NO:S350), this means that the user has set "Auto" for all of the other trays. Then in S370, "AUTO" is displayed on the display unit 91. Also, in S370, if "Remaining Tray" is set for other trays, then the setting for the other trays is changed from "Remaining Tray" to "Auto". Afterwards, this process ends. On the other hand, if so (YES: S350), then in S380, "Remaining Tray" is displayed on the display unit 91, and this process ends. It should be noted that "Remaining Tray" means to a setting that selects one of trays other than the specific tray.

For example, as shown in FIG. 9, if "Tray 1" is designated for the "Copy 2 Tray" item when "AUTO" is currently selected for all of the "Copy1 Tray", "Copy2 Tray", and "Copy3 Tray", then the setting for "Copy1 Tray" and "Copy3 Tray" is changed to the "Remaining Tray". Then, if the setting for the "Copy2 Tray" is changed from "Tray1" back to "AUTO", then the setting for "Copy1 Tray" and "Copy3 Tray" is changed from "Remaining Tray" back to "AUTO".

Figure 10:
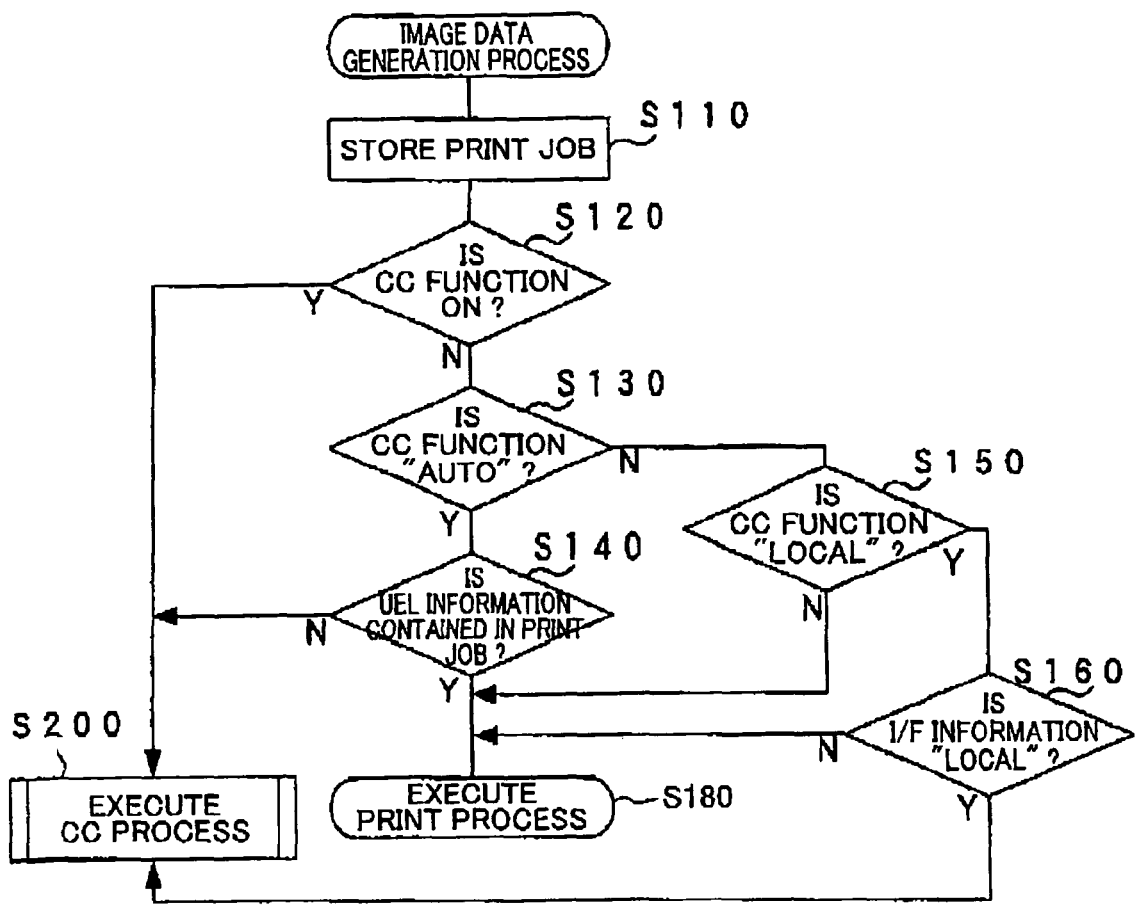
FIG. 10 is a flowchart representing an image data generation process according to the embodiment of the present invention.

Next, an image data generation process executed by the CPU 85 will be described with reference to the flowchart of FIG. 10. The image data generation process is executed when a print job is received through the input/output interface 89 from a personal computer or the like (not shown) when the power to the laser printer 1 is ON.

First in S110, a received print job is temporarily stored in the RAM 87. Then in S120-S150, the print job is analyzed, and the print condition information stored in the RAM 87 is checked.

Specifically, in S120, it is determined whether or not the setting of a carbon copy (CC) function included in the print condition information stored in the RAM 87 is "ON". If it is determined in S120 that the carbon copy function is set to "ON" (YES:S120), then the process proceeds to S200 to execute a carbon copy process to be described later. On the other hand, it is determined in S120 that the carbon copy function is not "ON" (NO:S120), then the process proceeds to S130.

In S130, it is determined whether or not the carbon copy function is set to "AUTO". If so (YES:S130), then the process proceeds to S140. On the other hand, if not (NO:S130), then the process proceeds to S150.

In S140, it is determined whether or not the print job contains UEL information. If not (NO:S140), this means it is highly likely that the print job has been transmitted directly from a terminal or the like connected to the laser printer 1, but not transmitted via a printer driver. In other words, it is highly likely that a user intends to use the laser printer 1 only for its carbon copy function. Then, the process proceeds to S200 to execute the carbon copy process. On the other hand, if so (YES:S140), this means that the print job was received through a printer driver, and it is highly likely that a plurality of users shares the laser printer 1. Then, in S180, a print process is executed. In this print process, print data contained in the print job is converted to image data using an image data expansion memory 86, and the image data is printed.

In S150, it is determined whether or not the carbon copy function is set to "Local". If so (YES:S150), this means that the print job was transmitted by a local connection, and it is highly likely that a user intends to use the laser printer 1 only for its carbon copy function, so the process proceeds to S160. On the other hand, if not (NO:S150), this means that the print job was transmitted over a network, and it is highly likely that a plurality of users shares the laser printer 1. Therefore, the process proceeds to S160 to execute the print process.

In S160, it is determined whether or not the I/F information contained in the print job is "Local". If not (NO:S160), then the process proceeds to S180 to execute the print process. On the other hand, if so (YES:S160), the process proceeds to S200 to execute the carbon copy process.

Figure 11:
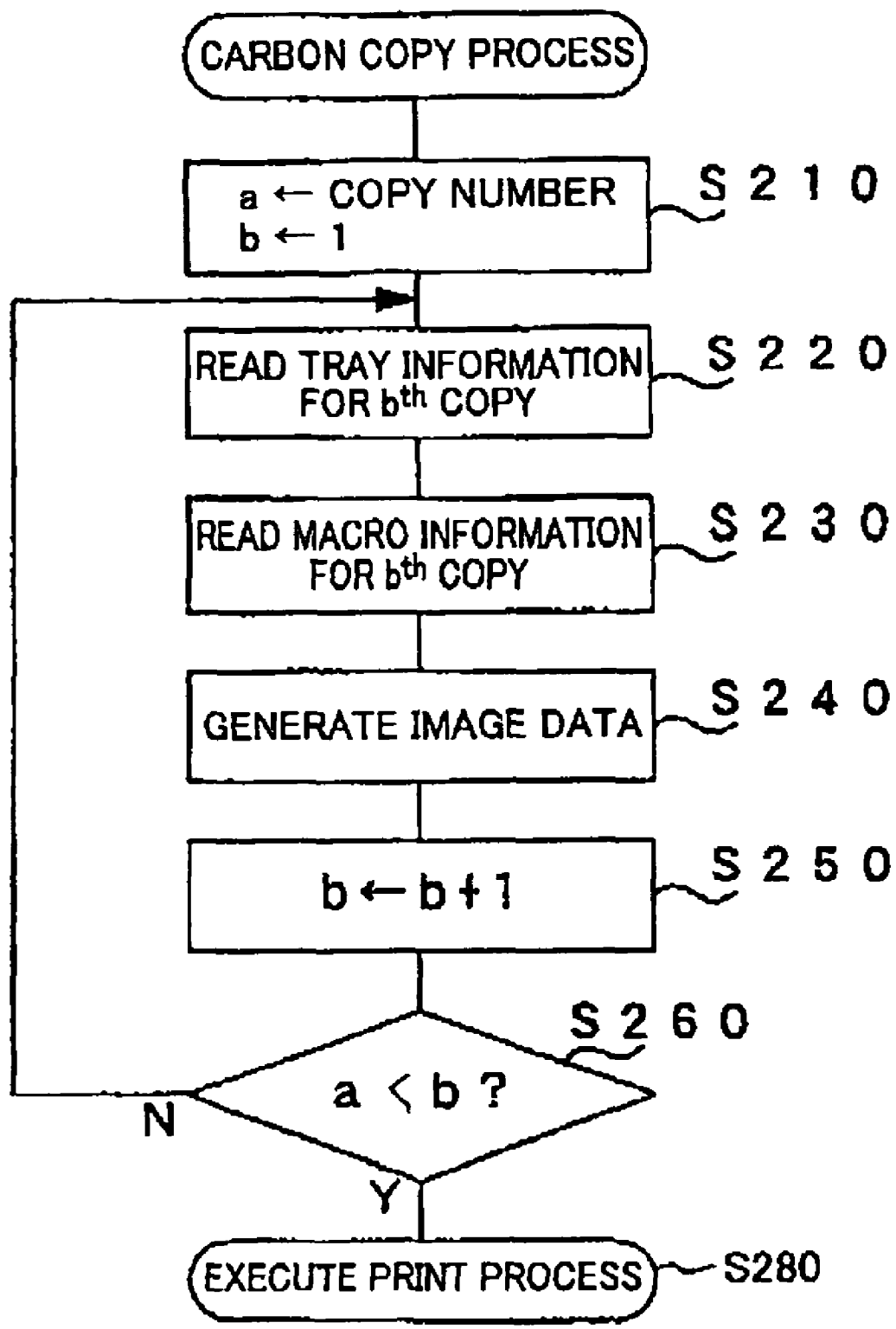
FIG. 11 is a flowchart representing a carbon copy process according to the embodiment of the present invention.

Next, the carbon copy process executed in S200 will be described with reference to the flowchart of FIG. 11.

First in S210, a variable a is set to the number of copies to print the print job (the number stored in the "Copies" item of FIG. 4($b$)), and a variable b is set to 1. Note that the values of variable a and variable b are always positive integers.

Next, image data is generated in the following manner. That is, in S220, tray information for $b^{th}$ copy included in the print condition information is read from the RAM 87. Next in S230, print data of the print job is read from the RAM 87, and also in S230, format data corresponding to the macro ID for the $b^{th}$ copy included in the print condition information is read from the RAM 87. In S240, image data is generated by combining the print data and the format data using the image data expansion memory 88 and stored in the RAM 87.

In S250, the value of variable b is incremented by 1. In S260, it is determined whether or not the value of variable b is greater than the value of variable a. If not (NO:S260), it is determined that the same number of image data sets as the number of copies has not been generated, and the process returns to S220. On the other hand, if so (YES:S260), it is determined that the same number of image data sets as the number of copies has been generated. Then, a print process is executed in S280.

Next, the print process executed in S280 will be described with reference to FIGS. 1 and 2.

It should be noted that the print process is executed in the above-described image data generation process that is executed while the laser printer 1 is in a standby state. The laser printer 1 enters the standby state after executing an initialization process when the power to the laser printer 1 is turned ON, for example. In the initialization process, the second drive motor 66 and the like are driven so as to rotate the photosensitive drum 23, the transfer roller 25, and the developer roller 27 of the process unit 16 and a heat roller 31 of the fixing device 19, and also power to a heater of the heat roller 31 is turned ON.

In this print process, first image data is read from the RAM 87, and tray information corresponding to the image data is also read. Then, one of the paper supply trays 6 is selected based on the tray information in the following manner.

(A) If the tray information designates a specific tray, such as "Tray1", then one of the paper supply trays 6 corresponding to the specific tray is selected.

(B) If the tray information has been set to "Auto", then one of the paper supply trays 6 is selected. For example, priorities are set for each tray, and the tray with the highest priority is selected from trays provided with paper 3.

(C) If the tray information has been set to "Remaining Tray", then trays to which other tray information is not set is searched for, and one of the searched trays is selected. For example, priorities are set for each tray, and trays to which other tray information has not set are searched for, and then one of the searched trays with the highest priority is selected.

Next, paper 3 is supplied from the paper supply tray 6 that was selected based on the tray information. Specifically, the clutch 70 is connected and then disconnected, so that a drive force is supplied to the paper supply roller 12 of a corresponding paper supply tray 6 for a short period of time. As a result, the paper supply roller 12 rotates. When the paper supply roller 12 rotates, an uppermost sheet of paper 3 on the paper supply tray 6 is picked up from the paper supply tray 6 through the cooperative operations of the paper supply roller 12 and the separation pad 13, and the picked up paper 13 is transported such that the leading edge of the paper 3 comes close to the third paper sensor 54 on the feed path 7.

When the CPU 85 receives a detection signal from the third paper sensor 54 indicating that the paper 3 was detected, the CPU 85 connects the third clutch 80 so as to rotate the feed rollers 11. When the reading edge of the paper 3 transported to between the drive roller 11a and the driven roller 11b by the paper supply roller 12, then the paper 3 is transported toward the feed rollers 10 by the feed rollers 11. Since the paper supply roller 12 is freely rotatable while the paper 13 is being transported by the feed rollers 11 as described previously, the tailing edge of the paper 3 is not restrained by the paper supply roller 12 so that the paper 3 is transported downstream only by the drive force of the feed rollers 11.

When the CPU 85 receives a detection signal from the second paper sensor 55 indicating that the paper 3 was detected, the CPU 85 connects the second clutch 81, thereby rotating the feed rollers 10. After a predetermined time has elapsed, the third clutch 80 is disconnected, enabling the feed rollers 11 on the upstream side of the feed rollers 10 to rotate freely. As a result, the paper 3 is transported to the registration rollers 9 only by the feed rollers 10.

When the CPU 85 receives a detection signal from the first paper sensor 56 indicating that the paper 3 was detected, the CPU 85 connects the first clutch 62 so as to rotate the registration rollers 9. At the same time, the CPU 85 disconnects the second clutch 81 for enabling the feed rollers 10 to rotate freely. As a result, the paper 3 is fed by the registration rollers 9. After a predetermined registration operation, the paper 3 is transported to the image formation position P by the registration rollers 9.

When the CPU 85 receives a detection signal from the image timing sensor 57 indicating that the paper 3 was detected, the CPU 85 activates the scanner unit 17.

More specifically, a laser beam emitted from the laser emitting section (not shown) based on desired image data passes through or is reflected by the polygon mirror 20, the lens 21a, the reflection mirror 22, and the lens 21b in this order so as to irradiate, in a high speed scanning operation, the surface of the photosensitive drum 23 of the process unit 18. As a result, an electrostatic latent image corresponding to the image data is formed on the photosensitive drum 23.

When the positively charged toner carried on the surface of the developing roller 27 is brought into contact with the photosensitive drum 23 as the developing roller 27 rotates, the toner is selectively attracted to portions of the photosensitive drum 23 that were exposed to the laser beam and, therefore, have a lower potential than the rest of the surface having a uniform positive charge. In this way, a toner image is formed.

When a predetermined time has elapsed after the detection signal has been received from the image timing sensor 57, the first clutch 82 is disconnected to allow the drive roller 9a of the registration rollers 9 to rotate freely. As a result, the paper 3 is transported by the photosensitive drum 23 and the transfer roller 25 with the leading edge of the paper 3 being sandwiched therebetween. A toner image reached the image formation position P is transferred onto the paper 3. The paper 3 with the toner image transferred thereto is transported to the fixing device 19. Note that the surface of the photosensitive drum 23 is cleaned by the developer roller 27 after the toner image has been transferred to the paper 3. When the CPU 85 receives a detection signal from the first paper sensor 56 indicating that the paper 3 has passed, it is determined that the trailing edge of the paper 3 has finished passing the registration rollers 9, so the rotation of the drive roller 9a and the driven roller 9b are halted.

The paper 3 transported to the fixing device 19 is then passed through a pressure portion between the rotating heat roller 31 and the pressure roller 32, and the toner image is thermally fixed on the paper 3 by the heat roller 31 and the pressure roller 32.

In order to discharge the paper 3 with an image printed on side thereof onto the discharge tray 36, the flapper 45 is pivoted upward. Then, the paper 3 is transported to the feed rollers 34 and then to the paper-discharge rollers 35 on a discharge path by the feed rollers 33. Afterwards, the paper 3 is discharged onto the discharge tray 36.

On the other hand, in order to perform two-sided printing, the flapper 45 is switched to the direction towards the reversing rollers 46. Then, the paper 3 sandwiched between the reversing rollers 46 is fed towards the reversing guide plate 48 by the forward rotation of the reversing rollers 46. Subsequently, the paper 3 is fed to the return feed rollers 47 by the reverse rotation of the reversing rollers 46. The paper 3 is fed by the inclined rollers 51 along the curved guide plate 52 and the main tray body 50 with the side edges of the paper 3 contacting reference plates (not shown). Then, the paper 3 is returned to the feed rollers 10 via the return feed guide plate 53. As a result, the paper 3 is reversed so that the unprinted surface of the paper 3 faces upward at the feed rollers 10 and the registration rollers 9. Therefore, an image can be formed on the rear surface of the paper 3 when the paper 3 passes the image formation position P. The paper 3 with the toner image transferred thereto is transported to the fixing device 19 for thermal fixing. After the flapper 45 is pivoted upward, the paper 3 is transported to the feed rollers 34 and then to the paper-discharge rollers 35 on the discharge path by the feed rollers 33 and discharged onto the discharge tray 36.

If there is a plurality of sets of image data, a next set of image data and tray information corresponding to the image data is read from the RAM 87. Then, a paper supply tray 6 is selected based on the tray information and the process is repeated in the same manner.

As described above, according to the laser printer 1 of the present embodiment, image data is generated by combining print data and format data corresponding to a macro ID for a $b^{th}$ copy, and an image is formed based on the image data on a paper 3 that was supplied from a paper supply tray 6 designated by tray information of the $b^{th}$ copy. Thus, images can be printed in different formats (customer's copy and file copy, for example) without requiring a user to perform additional manual work.

Also, when paper 3 for customer's copy is loaded to a paper supply tray 6, the user can select the paper supply tray 6 for a specific copy. In this case, a paper supply tray 6 other than the paper supply tray 6 selected for the specific copy is automatically selected for copies other than the specific copy. Therefore, the user is required less manual work than when the user selects the paper supply trays 6 for all of the copies.

It is conceivable that the printer 1 is connected to both a dedicated terminal that creates only documents that include a customer's copy and a file copy, such as quotation or contracts, and a general-purpose terminal that creates other ordinary printouts. In such a case, it would be tiresome for the user to have to switch between a setting for creating a document that necessitates a customer's copy and a file copy and a setting for creating an ordinary printout. Such switching is needed, for example, when an ordinary printout is created after a document that necessitates a customer's copy and a file copy has been created, and when a document that necessitates a customer's copy and a file copy is created after an ordinary printout has been created.

However, in this embodiment, the dedicated terminal is connected to a specific input port, and when print data is received through an input port other than the specific input port (in other words, when the I/F information included in the print job is Local, for example), it is assumed that the print data is for an ordinary printout. Then, the carbon copy process is not executed on the print data. That is, only one set of image data is printed by ordinary print process. On the other hand, if print data is received through the specific input port, it is assumed that the print data is for a document that necessitates a customer's copy and a file copy. Then, the carbon copy process is executed on the print data. Also, it is determined whether or not to execute the carbon copy process based on presence or absence of UEL information in print job, for example.

In this manner, since the determination as to whether or not to execute the carbon copy process is automatically made, it is unnecessary for the user to switch between a setting for creating a document that necessitates a customer's copy and a file copy and a setting for creating an ordinary printout.

Since the user inputs print condition information through the operating unit 92, the user does not need to create and transmit print condition information to the laser printer 1 each time the user requests image formation, increasing convenience to the user. Since the thus-set print condition information is stored in the RAM 87, once print condition information has been created there is no need to create the print condition information again unless the print condition information is needed to be changed, improving convenience to the user.

Since format data is pre-loaded into the RAM 87, there is no need to transmit format data together with the print data each time the user requests image formation.

For example, in the above-described embodiment, the present invention was applied to the laser printer 1, but the present invention can equally well be applied to a printer of other type, such as a color laser printer or an inkjet printer.

In the above-described embodiment, the RAM 87 pre-stores format data. However, format data could be transmitted together with print data and received through the input-output interface 89.

In the above-described embodiment, the user sets print condition information through the operating unit 92. However, print condition information created by a personal computer or the like could be transmitted together with the print data and received through the input-output interface 89 and stored in the RAM 87.

In the above-described embodiment, the print condition information included information for implementing carbon copies, such as "number-of-copies information", "macro ID", and "tray information", but the present invention is not limited thereto. For example, different types of paper could be loaded into the paper supply trays 6. That is, one paper supply tray 6 could be loaded with paper printed with "Customer's Copy" at a predetermined location, and other paper supply tray 6 could be loaded with paper printed with "File Copy" at a predetermined location. Alternatively, blue paper for the customer's copy could be loaded into one paper supply tray 6, and white paper for the file copy could be loaded into other paper supply tray 6. In such cases, the paper 3 can be distinguished without combining format data with print data when generating image data. Thus, the print condition information could include the "number-of-copies information" and the "tray information", omitting the "macro ID" information for designating the format data.

The determination of whether or not to perform carbon copy process could be made based on information that specifies the terminal that transmitted print data. For example, the terminal that transmits print data could be specified as either a dedicated terminal or general-purpose terminal, based on information that specifies the terminal, a client's name, or address. Then, the copy process could be performed if the specified terminal is a dedicated terminal, whereas ordinary image formation (in other words, the printing of one set of image data) could be performed if the terminal is a general-purpose terminal.

A program corresponding to the various processes described above could be stored on a recording medium, such as a floppy disk, MO disk, DVD-ROM, CD-ROM, or hard disk, that can be read by a computer, and the program could be used by being loaded into a computer and launched as required. Alternatively, ROM or backup RAM could be loaded with this program as a recording medium that can be read by a computer, and the ROM or backup RAM could be incorporated in a computer.

What is claimed is:

1. An image forming device comprising:
 a plurality of paper supply trays;
 a memory that stores:
  print data included in a print job,
  plural sets of format data,
  terminal information that indicates a terminal from which the print job is transmitted,
  command format information that indicates a command format of the print job, the command format information being included in the print job;
  print condition information including:
   copy information indicating a number of copies, the number of copies being an integer greater than one,
   format information designating one of the plural sets of format data for each of the copies, the number of which the copy information indicates, wherein a different one of the plural sets of format data may be specified for each of the copies, and
   tray information designating one of the plurality of paper supply trays for each copy,
  the memory continuing to store the print condition information after a copy image forming control operation;
 a plurality of input ports;
 a first judging unit that judges whether a prescribed input port in the plurality of input ports has received the print job;
 a second judging unit that judges whether the terminal information indicates a specified terminal;
 a third judging unit that judges whether the command format indicated by the command format information is other than a command format indicating that the print job is received through a printer driver;
 a determining unit that determines to execute a multiple copy printing process when at least one of the first, second, and third judging units has made a positive judgment and that determines to execute a normal printing when none of the first, second, and third judging units has made a positive judgment;

a controller that generates first image data corresponding to the print data when the determining unit determines to execute the normal printing and that generates second image data by combining one of the plural sets of format data and the print data stored in the memory for each copy when the determining unit determines to execute the multiple copy printing process;

an image forming unit that forms an image on a recording medium based on either one of the first image data and the second image data generated by the controller; and a paper supply mechanism that supplies a recording medium to the image forming unit from selected one of the paper supply trays, wherein the controller selectively performs a normal image forming control operation for forming a first image based on the first image data and the copy image forming control operation for forming a second image for each copy; and when the determining unit determines to execute the multiple copy printing process, in the image forming control operation, the controller selects one of the paper supply trays for a copy based on the tray information stored in the memory, controls the paper supply mechanism to supply a recording medium to the image forming unit from the selected one of the paper supply trays, reads the print data from the memory, reads one of the plural sets of format data for the copy based on the format information from the memory, generates the second image data by combining the print data and the format data read from the memory, and controls the image forming unit to form the second image on the recording medium supplied by the paper supply mechanism based on the second image data.

2. The image forming device according to claim 1, wherein when a specific one of the paper supply trays has been designated for a specific copy, the controller designates one of the paper supply trays other than the specific one of the paper supply trays for at least one of copies other than the specific copy.

3. The image forming device according to claim 1, further comprising an operating unit through which a user inputs instructions, wherein the controller creates print condition information based on the instructions and stores the print condition information into the memory.

4. The image forming device according to claim 1, wherein the determining unit determines to execute the normal printing if the image forming device is in a predetermined mode, even if any of the first, second, and third judging units has made a positive determination.

5. An image forming device comprising:
a plurality of paper supply trays;
a memory that stores:
  print data included in a print job,
  terminal information that indicates a terminal from which the print job is transmitted,
  command format information that indicates a command format of the print job, the command format information being included in the print job;
  print condition information including:
    copy information indicating a number of copies, the number of copies being an integer greater than one, and
    tray information designating one of the plurality of paper supply trays for each of the copies, the number of which the copy information indicates,
    wherein a different one of the plurality of paper supply trays may be designated for each of the copies,
the memory continuing to store the print condition information for each copy after a copy image forming control operation;
an image forming unit that forms an image on a recording medium based on the print data;
a paper supply mechanism that supplies a recording medium to the image forming unit from selected one of the paper supply trays;
a plurality of input ports;
a first judging unit that judges whether a prescribed input port in the plurality of the input ports has received the print job;
a second judging unit that judges whether the terminal information indicates a specified terminal;
a third judging unit that judges whether the command format indicated by the command format information is other than a command format indicating that the print job is received through a printer driver;
a determining unit that determines to execute a multiple copy printing process when at least one of the first, second, and third judging unit has made a positive judgment and that determines to execute a normal printing process differing from the multiple copy printing process when none of the first, second, and third judging units has made a positive judgment; and
a controller that selectively performs the copy image forming control operation for each copy when the determining unit determines to execute the multiple copy printing process and that performs a normal image forming control operation when the determining unit determines to execute the normal printing, wherein
when the determining unit determines to execute the multiple copy printing process, in the image forming control operation, the controller selects one of the paper supply trays for a copy based on the tray information stored in the memory, controls the paper supply mechanism to supply a recording medium to the image forming unit from the selected one of the paper supply trays, reads the print data from the memory, and controls the image forming unit to form an image on the recording medium supplied by the paper supply mechanism based on the print data read from the memory.

6. The image forming device according to claim 5, further comprising an operating unit through which a user inputs instructions, wherein the controller creates print condition information based on the instructions and stores the print condition information into the memory.

7. The image forming device according to claim 5, wherein the determining unit determines to execute the normal printing if the image forming device is in a predetermined mode, even if any of the first, second, and third judging units has made a positive determination.

8. An image forming device comprising:
a plurality of paper supply trays for supporting a recording medium;
a print data storing means for storing print data included in a print job;
a format data storing means for storing plural sets of format data;
a terminal information storing means for storing terminal information that indicates a terminal from which the print job is transmitted,
a command format information storing means for storing command format information that indicates a command format of the print job, the command format information being included in the print job;

a print condition information storing means for storing print condition information including:
  copy information indicating a number of copies, the number of copies being an integer greater than one,
  format information designating one of the plural sets of format data for each of the copies, the number of which the copy information indicates, wherein a different one of the plural sets of format data may be specified for each of the copies, and
  tray information designating one of the plurality of paper supply trays for each copy,
the print condition information storing means continuing to store the print condition information after a copy image forming control operation;

a plurality of input means;
a first judging means that judges whether a prescribed input means in the plurality of input means has received the print job;
a second judging means that judges whether the terminal information indicates a specified terminal;
a third judging means that judges whether the command format indicated by the command format information is other than a command format indicating that the print job is received through a printer driver;
a determining means that determines to execute a multiple copy printing process when at least one of the first, second, and third judging means has made a positive judgment and that determines to execute a normal printing when none of the first, second, and third judging means has made a positive judgment;
image data generating means for generating first image data corresponding to the print data when the determining means determines to execute the normal printing and that generates second image data by combining one of the plural sets of format data stored in the format data storing means and the print data stored in the print data storing means for each copy when the determining means determines to execute the multiple copy printing process;
image forming means for forming an image on a recording medium based on either one of the first image data and the second image data generated by the image data generating means;
paper supply means for supplying a recording medium to the image forming means from selected one of the paper supply trays; and
image forming control means for selectively performing a normal image forming control operation for forming a first image based on the first image data and the copy image forming control operation for forming a second image for each copy, wherein
when the determining means determines to execute the multiple copy printing process, in the image forming control operation, the image forming control means selects one of the paper supply trays for a copy based on the tray information stored in the print condition information storing means, controls the paper supply means to supply a recording medium to the image forming means from the selected one of the paper supply trays, reads the print data from the print data storing means, reads one of the plural sets of format data for the copy from the format data storing means based on the format information, controls the image data generating means to generate the second image data by combining the print data read from the print data storing means and the format data read from the format data storing means, and controls the image forming means to form the second image on the recording medium supplied by the paper supply means based on the second image data.

9. The image forming device according to claim 8, further comprising designating means for designating one of the paper supply trays, wherein when a specific one of the paper supply trays has been designated for a specific copy, the designating means designates one of the paper supply trays other than the specific one of the paper supply trays for at least one of copies other than the specific copy.

10. The image forming device according to claim 8, further comprising an operating unit through which a user inputs instructions, wherein the image forming control means creates print condition information based on the instructions and stores the print condition information into the print condition information storing means.

11. An image forming device comprising:
a plurality of paper supply trays;
a print data storing means for storing print data included in a print job;
a terminal information storing means for storing terminal information that indicates a terminal from which the print job is transmitted,
a command format storing means for storing command format information that indicates a command format of the print job, the command format information being included in the print job;
a print condition information storing means for storing print condition information including:
  copy information indicating a number of copies, the number of copies being an integer greater than one, and
  tray information designating one of the plurality of paper supply trays for each of the copies, the number of which the copy information indicates, wherein a different one of the plurality of paper supply trays may be designated for each of the copies,
the print condition information storing means continuing to store the print condition information for each copy after a copy image forming control operation;
image forming means for forming an image on a recording medium based on the print data;
paper supply means for supplying a recording medium to the image forming means from selected one of the paper supply trays;
a plurality of input means;
a first judging means that judges whether a prescribed input means in the plurality of the input means has received the print job;
a second judging means that judges whether the terminal information designates a specified terminal;
a third judging means that judges whether the command format indicated by the command format information is other than a command format indicating that the print job is received through a printer driver;
a determining means that determines to execute a multiple copy printing process when at least one of the first, second, and third judging means has made a positive judgment and that determines to execute a normal printing process differing from the multiple copy printing process when none of the first, second, and third judging means has made a positive judgment, and
image forming control means for selectively performing a copy image forming control operation for each copy when the determining means determines to execute the multiple copy printing process and that performs a normal image forming control operation when the determining means determines to execute the normal printing, wherein when the determining means determines to execute the multiple copy printing process, in the image forming control operation, the image forming control means selects one of the paper supply trays for a copy based on the tray information stored in the print condition information storing means, controls the paper supply means to supply a recording medium to the image forming means from the selected one of the paper supply trays, reads the print data from the print data storing means, and controls the image forming means to form an image on the recording medium supplied by the paper supply means based on the print data read from the print data storing means.

12. The image forming device according to claim 11, further comprising an operating unit through which a user inputs instructions, wherein the image forming control means creates print condition information based on the instructions and stores the print condition information into the print condition information storing means.

* * * * *